Figure 1:
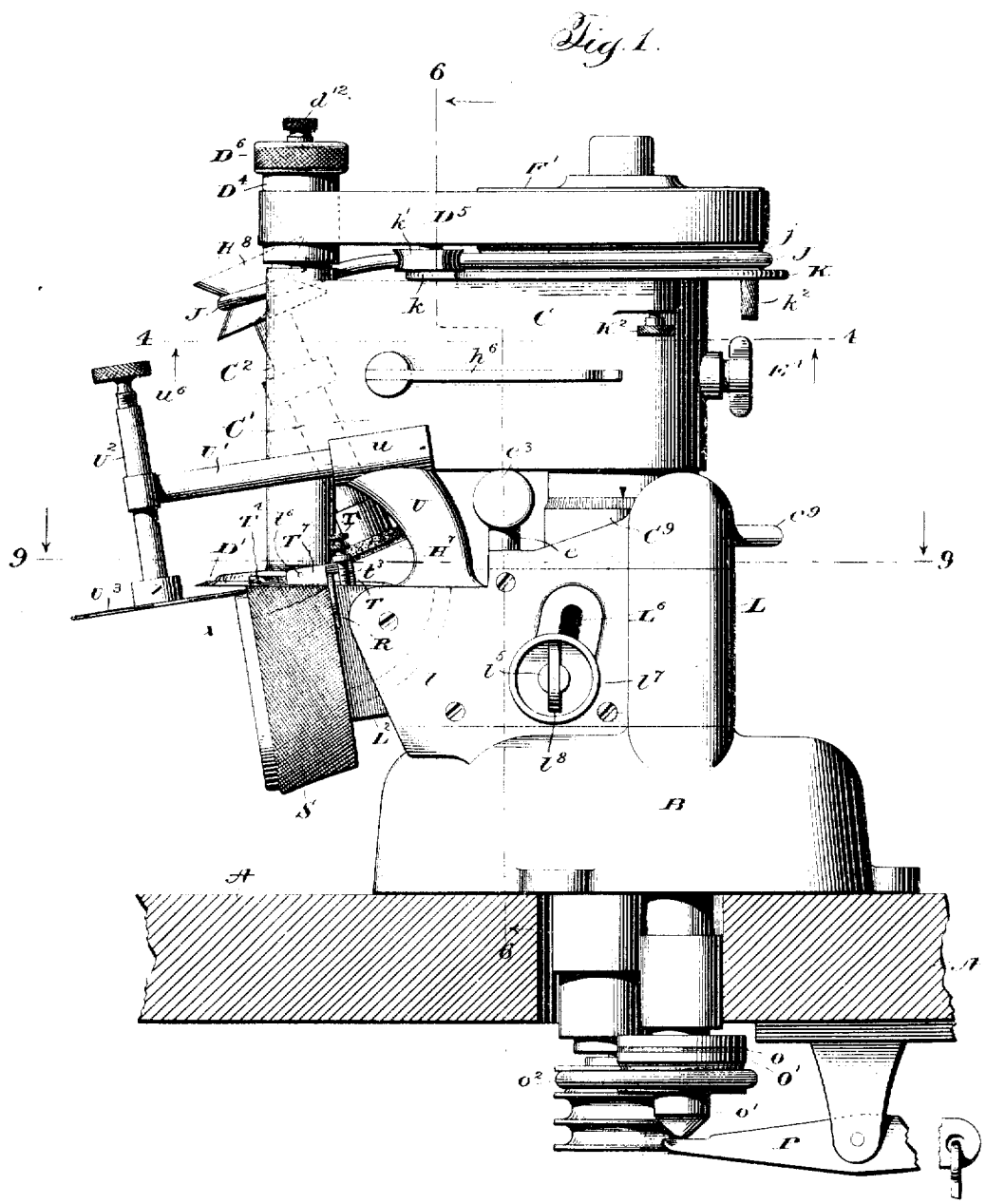

L. W. G. FLYNT.
SKIVING MACHINE.
APPLICATION FILED APR. 26, 1906.

1,015,882.

Patented Jan. 30, 1912.
9 SHEETS—SHEET 2.

Witnesses:
Jas. E. Hutchinson
Calvin T. Milans

Inventor:
Louis W. G. Flynt
By Bacon & Milans Attorneys

L. W. G. FLYNT.
SKIVING MACHINE.
APPLICATION FILED APR. 26, 1906.

1,015,882.

Patented Jan. 30, 1912.

9 SHEETS—SHEET 3.

Witnesses:
Jas. E. Hutchinson

Inventor:
Louis W. G. Flynt
By Bacon & Milans Attorneys

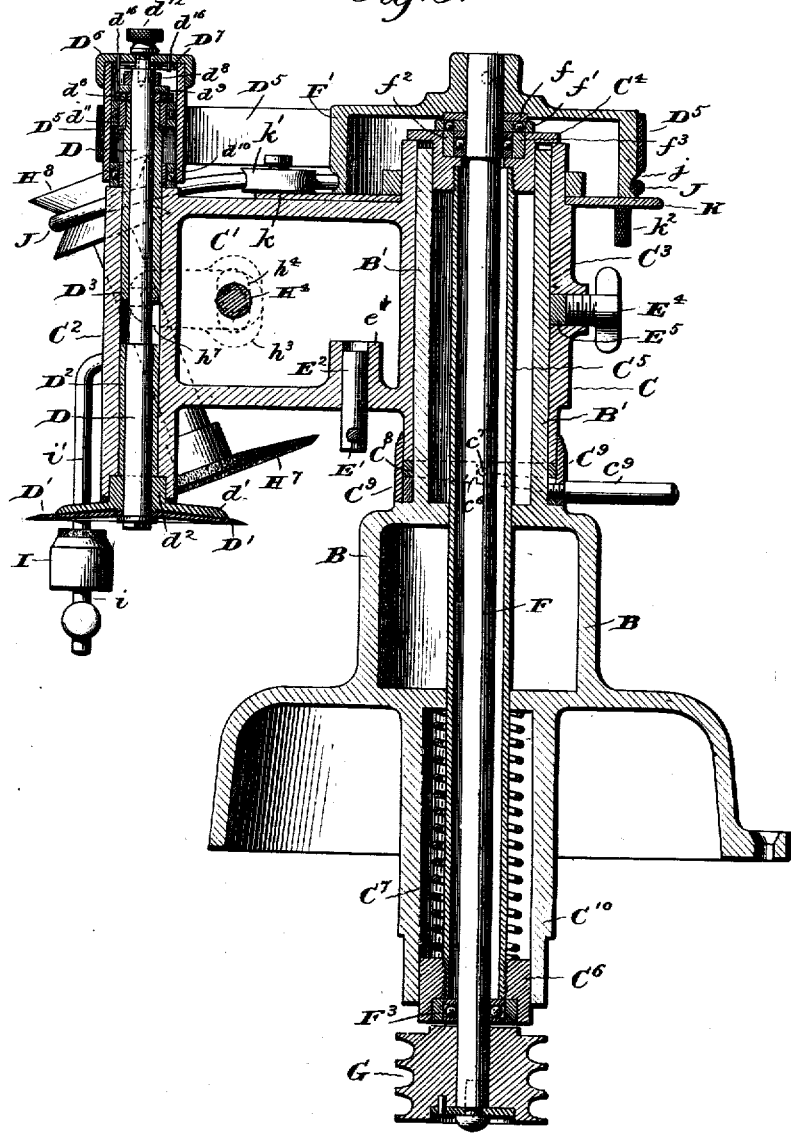

L. W. G. FLYNT.
SKIVING MACHINE.
APPLICATION FILED APR. 26, 1906.
1,015,882.
Patented Jan. 30, 1912.
9 SHEETS—SHEET 5.
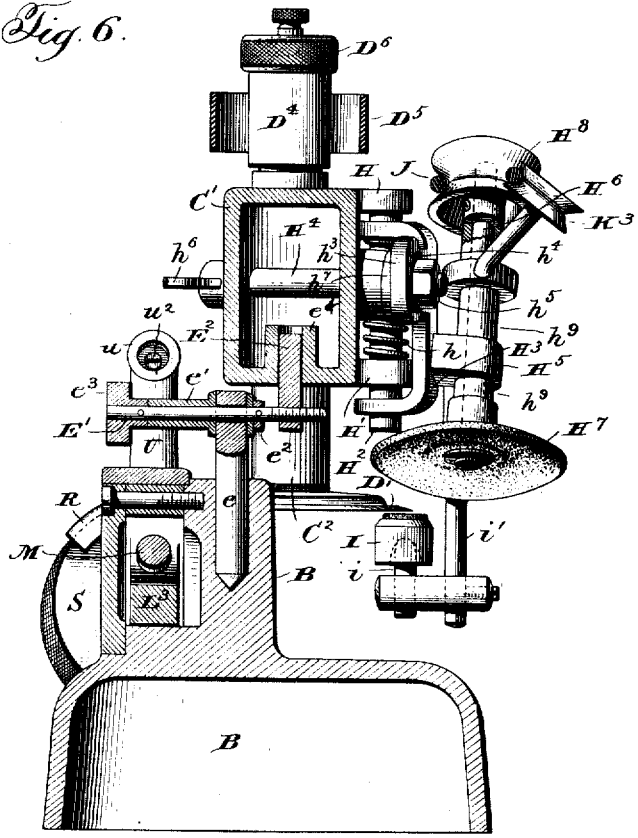
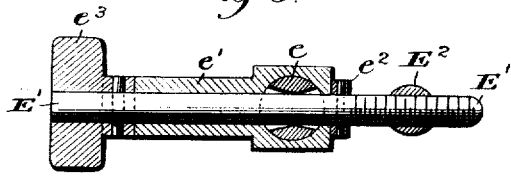
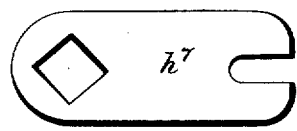
Witnesses:
Jas. E. Hutchinson
Calvin T. Milans
Inventor:
Louis W. G. Flynt
By Bacon & Milans Attorneys

L. W. G. FLYNT.
SKIVING MACHINE.
APPLICATION FILED APR. 26, 1906.

1,015,882.

Patented Jan. 30, 1912.
9 SHEETS—SHEET 6.

Witnesses:
Jas. E. Hutchinson
Calvin T. Milans

Inventor:
Louis W. G. Flynt
By Bacon & Milans Attorneys

L. W. G. FLYNT.
SKIVING MACHINE.
APPLICATION FILED APR. 26, 1906.
1,015,882.
Patented Jan. 30, 1912.
9 SHEETS—SHEET 7.
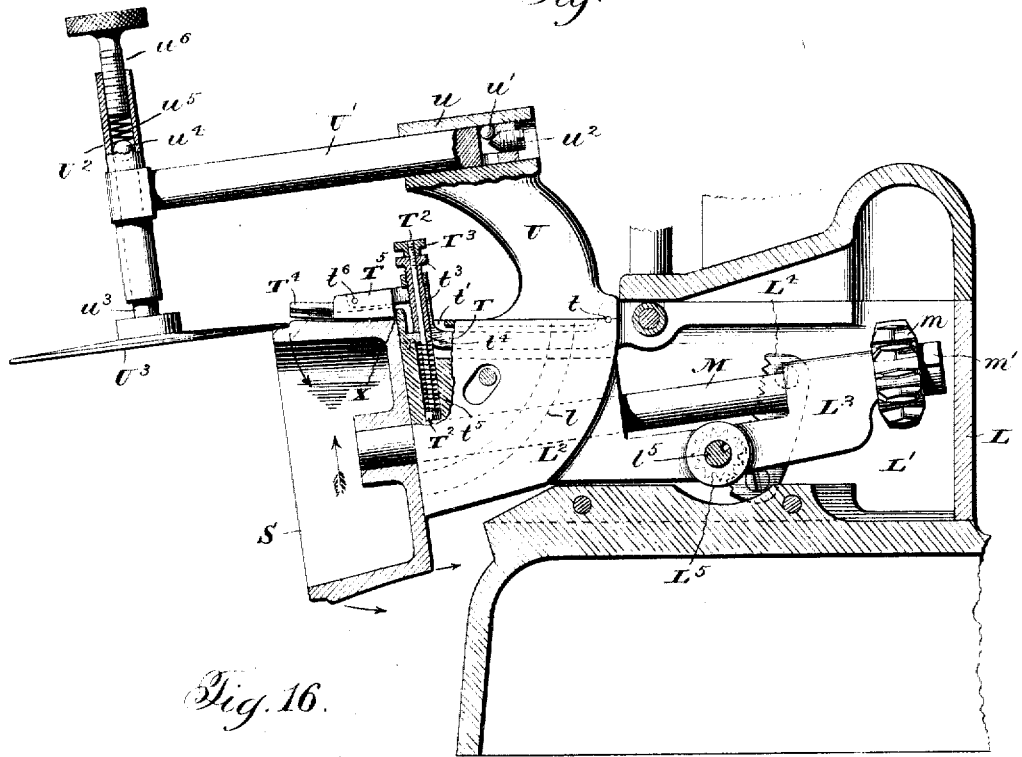
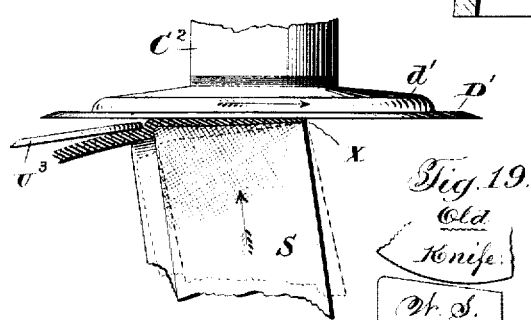
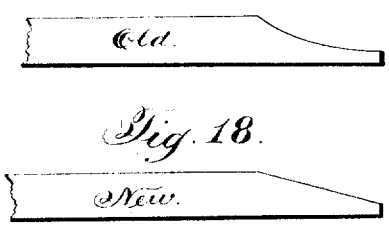
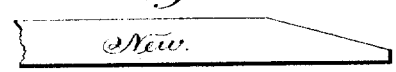
Witnesses:
Jas. E. Hutchinson
[signature]
Inventor:
Louis W. G. Flynt
By Bacon & Milans Attorneys

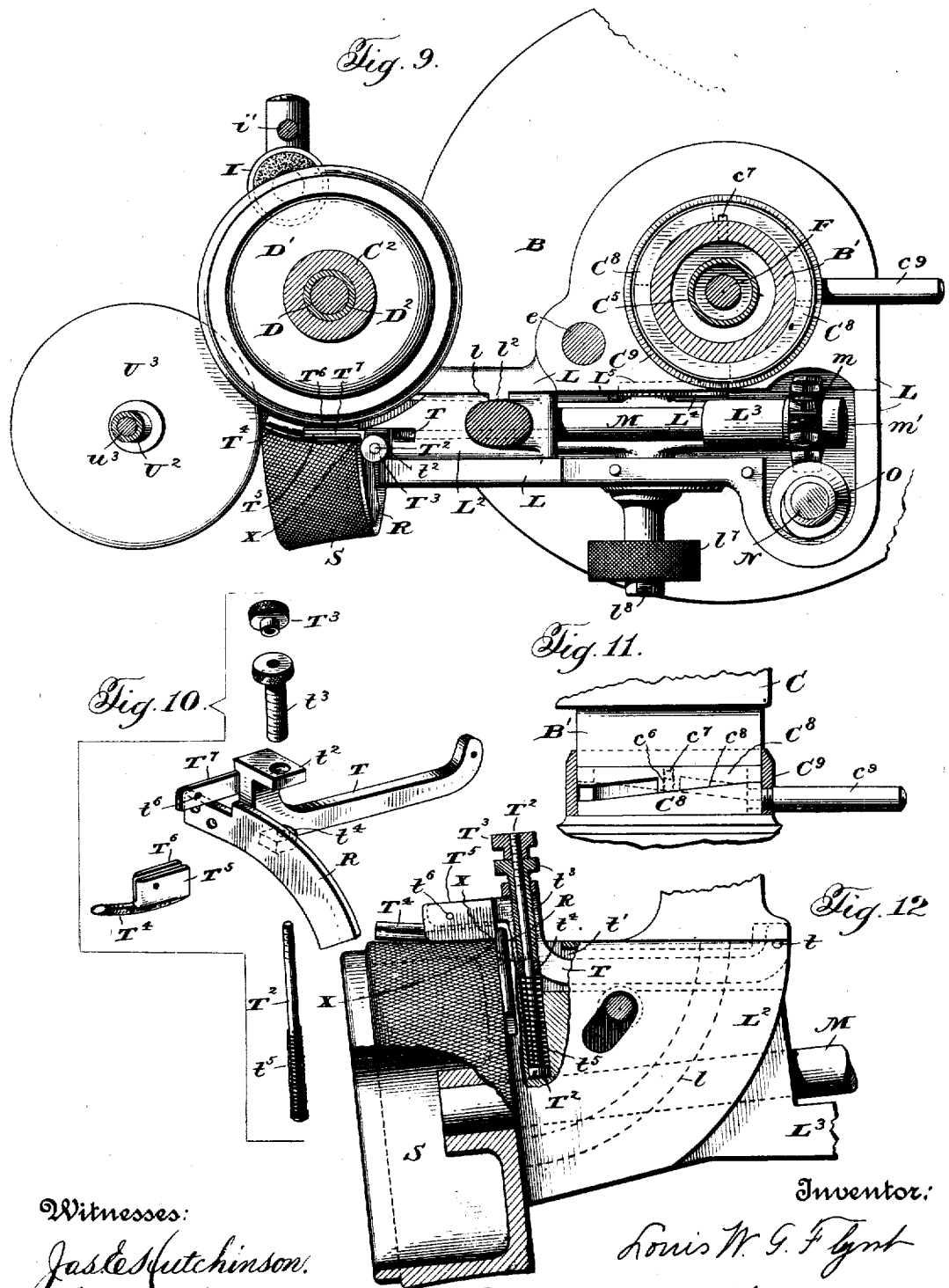

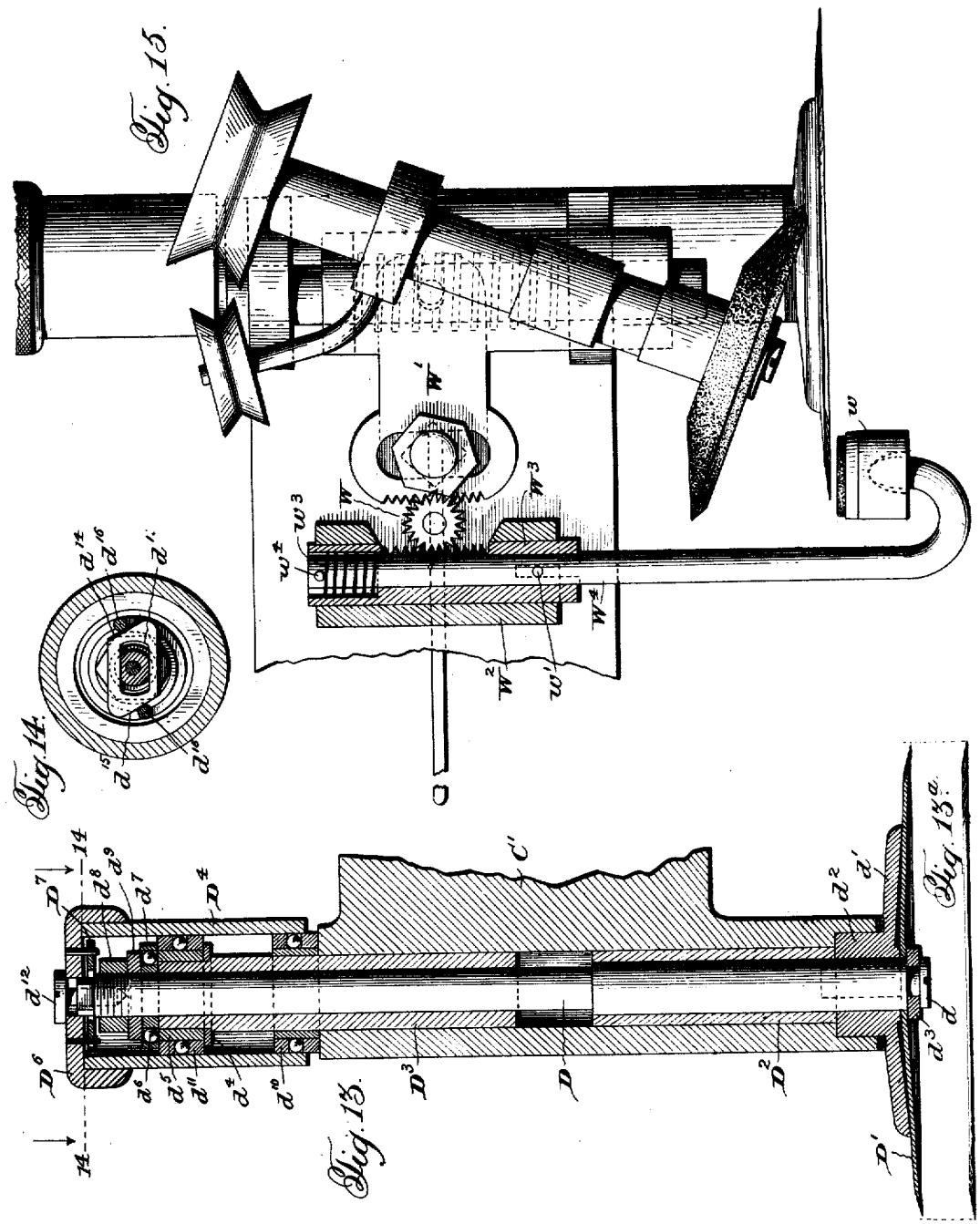

UNITED STATES PATENT OFFICE.

LOUIS W. G. FLYNT, OF ROCHESTER, NEW YORK, ASSIGNOR TO QUENTIN W. BOOTH AND IRVING E. BOOTH, BOTH OF ROCHESTER, NEW YORK.

SKIVING-MACHINE.

1,015,882.  Specification of Letters Patent.  Patented Jan. 30, 1912.

Application filed April 26, 1906. Serial No. 313,775.

*To all whom it may concern:*

Be it known that I, LOUIS W. G. FLYNT, a subject of Great Britain, residing at Rochester, in the county of Monroe and State of New York, have invented certain new and useful Improvements in Skiving-Machines, of which the following is a specification, reference being had therein to the accompanying drawing.

The present invention relates to an improved skiving machine designed more particularly for the skiving of the edges of leather for use in the manufacture of boots or shoes. The invention, however, is not necessarily limited to this particular use as the same may be employed for skiving leather or other material for use in various arts. It is therefore to be understood that while I have referred to the invention as a leather skiving machine and have suggested a particular use for which it is intended I do not wish to be limited to such particular useful application. In the art of skiving, several different classes of machine have heretofore been employed, each type having its own particular characteristic, such as the fixed knife machine; the belt knife machine, and the rotary disk knife skiving machine.

The present invention pertains to the latter class of skiving machines, that is to say, to that class wherein a rotary disk knife is employed as distinguished from a stationary knife although some of the features of the invention can undoubtedly be used with other types of machines and so with beneficial results.

Heretofore in machines of the particular class wherein rotary circular knives are employed, it is necessary to have a work support and these work supports have been employed in addition to their function of supporting the material to be skived, also as a feeding device for progressively presenting the stock to the knife. As far as I am now advised, commercially the usual practice has been to simultaneously operate the knife and the work support, the same being so geared or coupled that the interruption of the movement of one member interrupts the movement of the other member. This has a disadvantage in that the workman or operator will in many cases feed the stock to the knife prior to the latter having acquired the necessary speed to primarily effect the cutting or skiving.

One of the characteristics of the present invention is to provide a machine whereby the knife can be maintained at its maximum or proper speed of rotation at all times and in connection therewith the work support and feed can be independently governed or varied in its movement, thereby overcoming the objections to the machines heretofore in use. It has been the practice heretofore in connection with the use of machines of this type to vary the inclination of the knife relative to the work support either by inclining the knife or the support when the angle of the skive is to be varied. Such adjustments have necessitated the adjustment of at least two and in many cases a greater number of parts so as to preserve requisite thickness of the edges of the skive.

My present invention includes means for avoiding the necessity of adjusting a plurality of parts when the angle of the skive is to be changed and consists generally in means for effecting this adjustment by the movement of a single part or member, at the same time preserving the desired or requisite thickness of edge of the material.

With the rotary disk skiving knife heretofore in use, as far as I am now advised, all machines necessitated a construction whereby certain parts were required to be adjusted longitudinally of the machine, that is from left to right. This was particularly true in connection with the gaging member.

My present machine is designed to avoid the necessity of all longitudinally movable members and this is accomplished by so constructing the machine that a fixed gaging part may be employed and the requisite angular adjustments are effected from a point coincident with the gaging surface and the vertical axial plane of the work support.

A further object of the invention is to produce a skiving machine which will do the work rapidly; in which the adjustments can be easily made, and which will require but little skill on the part of the user to effect the various adjustments and in operating the machine.

A further object is to so construct the work support that as the opening or space between it and the circular knife is varied from the minimum to the maximum angles or vice versa the said space or opening will, in all positions be regular from the narrow end to the larger so that a straight bevel can be cut from the work as distinguished from the curved bevel heretofore produced.

Heretofore in machines of this class having a circular knife and in which the work is supported and fed by the surface of a revolving cylinder or cone, the opening between the knife and work support is such from the narrowest to the widest portion that a straight bevel cannot be cut from the work, but the space opens from the narrow to the wider portion in a steadily increasing ratio depending upon the diameter of the knife and that of the work support. The effect of this, more noticeable on a wide scarf, is to bevel or skive the material operated upon to a curved section as shown in Fig. 17 instead of a straight bevel as shown in Fig. 18 as is usually desirable.

It is obvious that the narrower the scarf or bevel and the larger in diameter the knife and work support, the nearer to a straight line will be the beveled cut. In practice the size of the knife is limited by the difficulty and expense of manufacturing a large knife so that it will run accurately, and the size of the work support by the convenience of feeding the work and the expense of large rolls. To partly overcome this difficulty is has been common to construct skiving machines so that the knife and the gage can be moved longitudinally in relation to each other and to the work support to bring the center of the knife as near as may be to the middle of the cut, but this is only an approximation to the desired result. In my improved machine I have entirely overcome this difficulty by forming the work support so that a section through its axis would show the surface to be formed to a curve of a shape that would be generated by the intersection of the revolving work support with the circular knife when the work support is adjusted to its least angle with the knife, the knife being lowered while in working position, to intersect the surface of the work support.

A further improvement consists in the provision of improved means for grinding the knife both on its upper inclined surface as well as the lower surface.

A further object is to provide an improved means for mounting the knife shaft in its bearings so as to maintain the same in its true position and avoid the result of lateral strain from the driving means which has heretofore caused undue wearing of the knife shaft and its bearings. The construction also enables the knife shaft to be revolved at a very high rate of speed.

Various other improvements and advantages will presently be stated in connection with the description of the invention.

In the accompanying drawings, I have shown a machine embodying the invention but I desire it understood that the invention is not limited to the specific details illustrated and presently to be described, as various modifications, changes, and alterations in the parts can be made and substituted for those shown without in the least departing from the general nature and principle of the invention.

Figure 2:
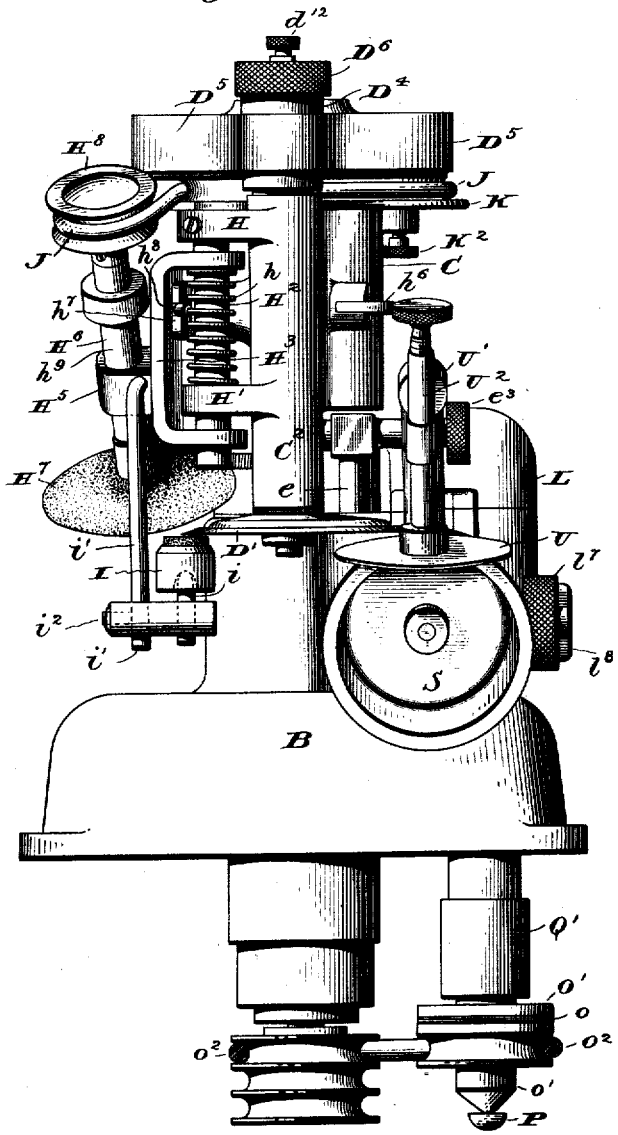
Figure 3:
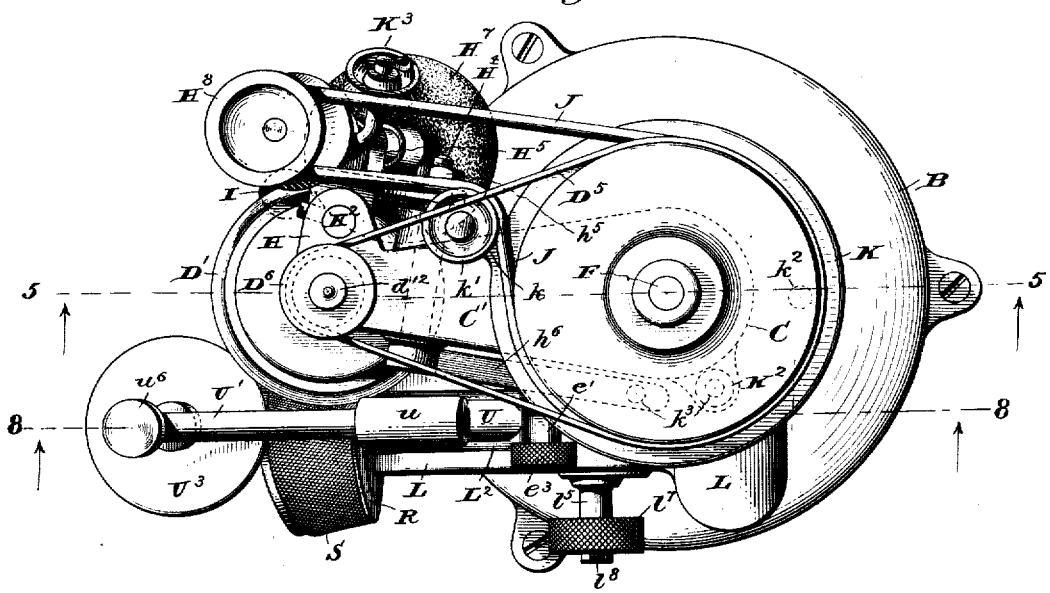
Figure 4:
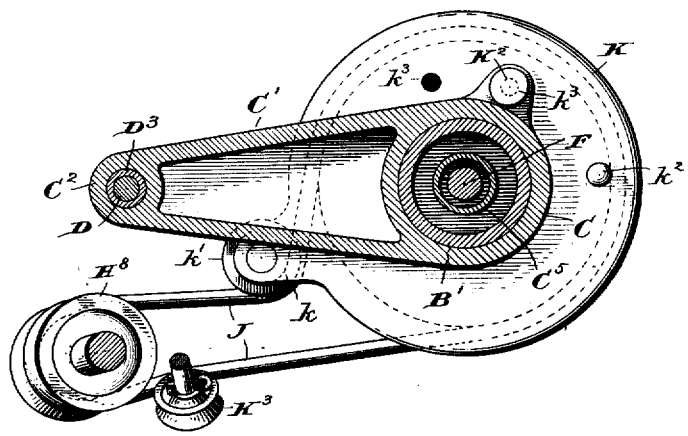
Figure 7:
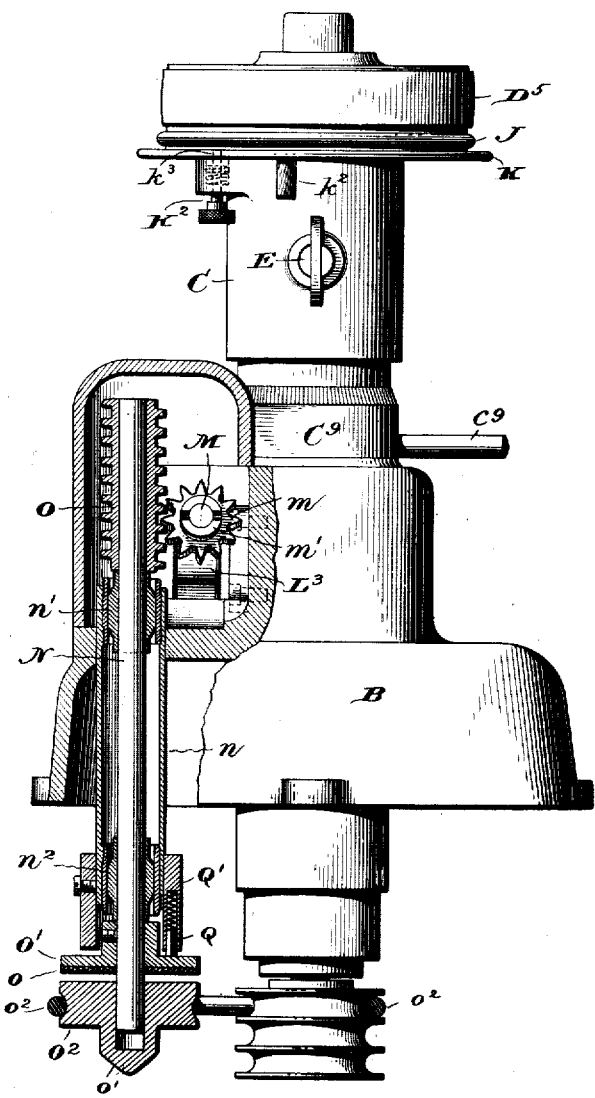

In the drawings, Figure 1 is a front elevation of the machine showing the supporting base in section, Fig. 2 is a side elevation looking from left to right of the machine as shown in Fig. 1, Fig. 3 is a plan view, Fig. 4 is a cross section taken on the line 4—4 of Fig. 1 looking up, Fig. 5 is a vertical longitudinal section taken on the line 5—5 of Fig. 3, Fig. 6 is a vertical section taken on the line 6—6 of Fig. 1, Fig. 6$^a$ a section of the lateral adjusting means, Fig. 6$^b$ is a detail of the grinder crank, Fig. 7 is an elevation looking from right to left of the machine as shown in Fig. 1 and showing parts of the work support and actuating means and the casing thereabove in section, Fig. 8 is a somewhat enlarged sectional view taken on the line 8—8 of Fig. 3 and showing parts in elevation. Fig. 9 is a plan view showing parts in section taken on the line 9—9 of Fig. 1, Fig. 10 represents the various parts of the gage and presser finger in perspective and separated, Fig. 11 is an elevation showing parts in section of the vertical adjusting means for the head, Fig. 12 is an enlarged detail view partly in section of the work support and its associated parts, Fig. 13 is an enlarged sectional view of the knife and its supporting parts, Fig. 13$^a$ an edge view of the knife, Fig. 14 is a view in plan showing parts in section on the line 14—14 of Fig. 13, Fig. 15 is an elevation showing parts of a modified form of sharpener attachment, and Figs. 16, 17, 18, 19 and 20 are diagrammatic views illustrative of the method of operation and the result of the various adjustments and operations.

In the drawings, A designates the supporting surface or bench, B the base of the machine and C the head. This head member is provided with a lateral arm C' and in its construction is independent of the base member B. On the head member C is mounted on a vertical shaft D the circular swinging knife D', the said shaft working in a suitably and conveniently arranged vertical bearing part C$^2$ on the lateral arm C', the details of which knife and its support will be hereinafter described.

Mounted in the base part B of the machine in a manner presently to be described is located the adjustable work support S, the same being positioned below the plane of the knife D' the vertical plane of its axis being coincident with the foremost point of the cutting edge of the knife as shown in Fig. 2. To effect a vertical adjustment of the knife relative to the support as well as for properly positioning the knife transversely relative to the support so that the machine may be properly adjusted for varying the amount of material to be skived from the stock as well as to compensate for the wear of the knife, I conveniently form the head carrying the knife independent of the base B and couple the same for relative vertical adjustment in the following manner. Springing from the upper face of the base B is a tubular extension B' which extension passes through a cylindrical bearing $C^3$ formed in the head part C. This bearing is so proportioned that a close running fit is produced between the tubular extension B' and the bearing, thus avoiding any lateral movement between the same. The end of the bearing $C^3$ is extended slightly above the end of the extension B' as shown in Fig. 5. $C^4$ designates a head block having a cylindrical portion fitted loosely in the upper end of the extension B' and an outwardly extended flange portion overlapping and normally resting on the upper edge of the bearing $C^3$. Threaded into the cylindrical part of the block $C^4$ is a tube member $C^5$ extending through the extension B' and through an opening in the base B to a point below the plane of the base. This tubular member carries on its lower end a block $C^6$ conveniently threaded to the tube and between this block and the lower surface of the base B is interposed, and surrounded by a depending tubular part $C^{10}$ of the base, a coil spring $C^7$ the tendency of which is to tightly force the flange of the head block $C^4$ onto the surrounding edge of the bearing $C^3$ of the head thereby maintaining the head normally in its position relative to the base. To adjust the head vertically and thereby elevate the knife relative to the work support, a suitable collar $C^8$ is interposed between the upper face of the base adjacent the lower end of the tubular extension B' and the lower edge of the bearing $C^3$. This collar is formed conveniently with two oppositely arranged inclined upper bearing faces upon which rest complementary inclined bearing faces $c^8$ at the base of the bearing part $C^3$. This collar is made to fit the lower part of the tubular extension B' and to be movable around the same, which movement may be conveniently effected by a handle $c^9$ extending from the collar or by any other suitable means. By turning the handle backward or forward, the complementary inclines $c^8$ are caused to move up or down the inclines on the collar as the case may be and thereby effect the vertical movement of the head, the spring $C^7$ tending at all times to draw the head downward. In practice the complementary inclined part $c^8$ is made in the form of a sleeve or ring having a straight upper face on which the lower edge of the bearing $C^3$ rests, as shown in Fig. 11. This ring is prevented from rotating by any suitable means conveniently by a pin or pins or lugs $c^7$ extending out from the tubular extension B' into vertical grooves $c^6$ formed in the inner face of the ring. By this means the ring is permitted an up and down movement but is prevented from rotating with the collar $C^8$ while at the same time the head may be rotated to vary the lateral position of the knife relative to the work support without in any manner affecting its vertical position. I have found it convenient to surround the joint between the head and the base at the point where the collar is positioned, by a sleeved member $C^9$ through which the handle projects into the collar $C^8$. The upper edge of this sleeved member is chamfered off and is provided with a scale registering with a suitable indicating mark on the head, as shown in Fig. 1. By this means the operator can adjust the head up or down according to the thickness of the stock to be treated and the extent of adjustment desired ascertained by reference to the scale.

To effect the lateral adjustment of the knife relative to the work support any suitable means can be employed. I however have shown a means suitable for this purpose which consists conveniently in a thumb screw E' mounted for rotation and slight swinging movement in a pin or post $e$ springing from the upper surface of the base B, as shown in Fig. 6. This thumb screw is supported against longitudinal movement by a sleeve $e'$ and a nut $e^2$, the former being held in position by the thumb nut $e^3$. The inner end of the thumb screw E' passes through a threaded opening in the end of a vertically movable pin $E^2$ mounted in a socket $e^4$ in the lateral arm of the head, as shown in Fig. 6. By turning the thumb screw, the head is swung on its pivot while at the same time the vertical adjustment of the head is permitted by the loose connection between the same and the pin $E^2$. It will be noted that the thumb nut $e^3$ is in a convenient position for handling by the operator while standing at the front of the machine. When the head has been properly adjusted either vertically or laterally it is locked in position against accidental movement by the binding screw $E^4$ (Fig. 5) mounted in a threaded aperture in the wall of the head with its end resting against a friction block $E^5$ of any convenient material. This friction block when forced in engages the wall of the tubular extension B'.

I will now describe the circular knife, its manner of mounting and the driving mechanism therefor. In Fig. 13 the knife and its supporting shaft are illustrated, the latter being in elevation while the former is shown in section. As stated, it is highly desirable to prevent as far as possible lateral strains on the knife shaft. This is particularly so in view of the fact that these knives are driven at a very high rate of speed. The knife D' is mounted and carried by the vertically disposed shaft D which in turn is extended through and carried by the outer end of the lateral arm C' of the head. The shaft D has shrunk onto or otherwise secured to its lower end a knife carrying disk $d'$, which is of concaved formation on its under side. This disk is provided with a cylindrical extension $d^2$ fitted in the socket in a depending extension of the lateral arm C' and is there permitted rotation. The lower end of the shaft carries a screw $d$ entering longitudinally in a screw threaded bore therein and between a washer $d^3$ in the head of the screw is placed the knife D' and there secured. $D^2$ designates a bushing secured in the bore of the lateral arm C' and forming a bearing for the lower end of the shaft to rotate in, while a similar bushing $D^3$ is secured in the upper end of the bore of the lateral arm and projects a distance above the same. Surrounding the upper end of the bushing and secured thereto is a metal ring $d^4$ upon which rests a bearing sleeve $d^5$. This bearing sleeve is conveniently of hard metal and supports on its upper end a series of rollers $d^6$, held in position by suitable rings $d^7$ arranged above the upper end of the bushing $D^3$. The shaft D has a nut $d^8$ screwed onto the upper end and below the nut is the bearing plate or disk $d^9$ resting on the top of the balls $d^6$. Thus a ball bearing support is formed against the downward thrust of the knife which bearing can be easily adjusted by virtue of the nut $d^8$. Surrounding the projecting end of the bushing $D^3$ are two ball bearings $d^{10}$, $d^{11}$ arranged one above the other and spaced somewhat apart. $D^4$ designates the pulley or sleeve upon which the driving belt $D^5$ is placed. This sleeve is somewhat elongated and embraces substantially the entire extension of the bushing $D^3$ as well as the upper end of the shaft. The upper end of the sleeve or pulley $D^4$ is capped by a cap piece $D^6$ conveniently rigid thereon. Through the center of the cap loosely passes a retaining screw $d^{12}$ entering the upper end of the shaft D. To transmit the motion from the pulley to the shaft and to free the shaft in its rotation from all lateral strain due to the driving means, a yoke member $D^7$ is placed on the upper end of the shaft which latter is squared off on opposite sides and enters an elongated slot $d^{13}$ in the yoke. This yoke is provided on opposite sides with oppositely arranged inclined parts or edges $d^{14}$ $d^{15}$ with which engage depending pins $d^{16}$ secured fixedly to the cap $D^6$, as shown in Figs. 13 and 14. Power is transmitted to the pulley $D^4$ through the belt $D^5$ in a direction at right angles to the shaft. The pressure of the belt on the pulley is taken up by the extended end of the bushing through the ball bearings with which the inner surface of the pulley engages, the shaft being supported on a ball bearing and by virtue of the sliding yoke $D^7$ the shaft with relation to the pulley is automatically relieved of lateral strain and is rotated by the contacts of the pins $d^{16}$ and with the inclined parts of the yoke. Manifestly, should the pulley be slightly off center, with the shaft, the pin on one side of the yoke riding up the adjacent incline carries the yoke over until engagement is made with the opposite pin, thus forming a flexible self-adjusting coupling through which the motion of the belt is transmitted to the shaft.

While I have specifically shown and referred to ball bearings which are highly desirable, in view of the fact that the knife is rotated at a very high rate of speed, yet it is to be understood that other forms of bearing can be employed if desired. In fact the driving connection between the pulley and the shaft is in its nature a floating drive and when this term is employed I desire it understood that it refers to that type of transmission wherein the driven member is relieved of all strains except torsion.

F designates the driving shaft of the machine. This shaft is positioned centrally in the tube $C^5$ and has secured fixedly to its upper end a driving pulley F' around which the belt is passed. The pulley F' is conveniently of shell formation, its peripheral part extending down and containing the upper ends of the bearing and the head block above referred to, and a steel washer or bearing plate $f$ resting on a ball bearing $f'$. This ball bearing rests with its under side on the outer ring $f^2$ of a laterally placed ball bearing $f^3$ surrounding the upper end of the shaft. The bearing $f^3$ is positioned in a recess in the head block $C^4$ and serves to receive the lateral pressure on the shaft F, while the bearing $f'$ serves as a support for the shaft and its pulley. The lower end of the shaft F passes through a ball bearing $F^3$ located in the block $C^6$ at the lower end of the projection $C^{10}$ of the base.

G designates a driving pulley keyed to the lower end of the shaft F and having its periphery conveniently provided with a plurality of belt grooves, as shown in Fig. 5. Motion being imparted to the shaft through a suitable belt applied to the pulley G, the same is transmitted to the driving pulley F' thence through the belt $D^5$, to the pulley $D^4$, to the shaft of the cutter or knife, which is thereby rotated at a very high rate of speed, the relative diameters of the pulleys $D^4$ and F' being such as to impart to the former its rapid rotation.

By the above described construction, it will be observed that the circular knife with its immediate driving parts is carried entirely by what I have termed the head of the machine and that the adjustments vertically and laterally relative to the work support are effected by the adjustment of the head and so without disturbing any other parts of the machine. This is of importance inasmuch as it renders the operation of adjustment exceedingly simple, quickly effected, and very positive, at the same time the position of the driving parts or bearings are undisturbed during the various adjustments.

In this type of machine it is necessary, or at least highly desirable, to have associated with the mechanism suitable grinding means for maintaining the cutting edge of the circular knife in proper condition. With this in view, I have extended from the rear part of the outer end of the lateral arm C' two lugs H and H' spaced apart and provided with suitable registering apertures in which latter is secured a cylindrical pin $H^2$.

$H^3$ designates a yoke having its respective horizontal arms provided with apertures sleeved on the pin $H^2$, the lowermost being below the lug H', while the upper arm of the yoke is positioned between the lugs. A spring $h$ is sleeved on the pin $H^2$ below the upper arm of the yoke and serves to maintain the yoke in its intermediate position free to move for a short distance upward. Extending back from the yoke is an arm $h^3$, as shown in dotted lines in Fig. 5 and in full lines in Fig. 6. This arm is provided with an oblong vertical slot $h^4$ through which the adjusting shaft $H^4$ passes, the outer or rear end of the shaft being capped by a suitable nut $h^5$ loosely engaging the slotted arm $h^3$. The shaft $H^4$ passes through the lateral arm, as shown in Fig. 6, and carries on its opposite end a hand lever $h^6$, Figs. 3 and 6. On the rear end of the shaft $H^4$ and between its bearing on the lateral arm and the slotted arm $h^3$ of the yoke is positioned a bifurcated crank arm $h^7$, the same extending toward the yoke and has a square opening fitting a squared part of the shaft $H^4$ to prevent turning thereon. On the inner face of the yoke is a pin or lug $h^8$ located in the bifurcation of the crank arm $h^7$. By this means the operator, by raising the lever $h^6$ rocks the crank arm and forces the yoke $H^3$ down against the tension of the supporting spring. The arm $h^3$ extending from the yoke in connection with shaft $H^4$ and nut $h^5$ is designed to prevent the yoke from rotating on the vertically disposed pin $h^2$ and does not interfere with the up and down movement of the yoke, owing to the elongated slot in its rear portion and the loose fit of the end of shaft $H^4$ therein.

Extending from the outer face of the yoke $H^3$ is a projection $H^5$ having tubular extensions $h^9$ extending on opposite sides and rigid therewith. These extensions and the projection $H^5$ are arranged oblique to the vertical plane of the machine and carry a shaft $H^6$, which shaft carries on its lower end the emery wheel or grinding disk $H^7$ and the belt pulley $H^8$ at its upper end, both keyed to the shaft in any convenient manner. The position of the emery wheel and its carrying parts is such that as the arm $h^6$ is elevated, depressing the yoke and the parts carried thereby, the edge of the emery wheel or grinding disk will be brought into the proper position and by virtue of the angular position to the cutting edge of the disk, will serve to grind and sharpen the cutting edge of the disk during the latter's rotation. The moment the operator releases his hand from the lever $h^6$ the spring will carry the grinding disk up out of its plane of operation in contact with the rotary knife.

In this class of machines, it is necessary to remove the so-called feather edge from the rotary knife after the same has been ground and the practice heretofore has been usually for the operator to place a stone or grinding device up against the under face of the disk. It has been found in practice that this is objectionable owing to the fact that it is quite difficult to place the grinding device in proper position relative to the under surface of the disk without affecting or destroying the edge to a certain extent. To avoid this, I have provided a self-centering grinding block which is shown more particularly in Fig. 2, the same being designated by the letter I. This feather edge grinder consists conveniently of a block of abrasive material carried by the holder I, which latter has a socket in its lower face into which is loosely fitted a pin $i$ having a rounded upper end and being carried by a bracket $i'$ extending from the lug $H^5$ to which it is fixedly secured. The upper face of the feather edge grinder is conveniently flat and as the operator depresses the handle $h^6$, thus raising the yoke $H^3$, it brings the upper face of the feather edge grinder into contact with the under face of the outer edge of the rotary knife and, owing to the fact that it is loosely supported on the pin $i$ subject to lateral wabble or play, the grinding surface will find its level when brought into contact with the disk and thus properly remove the so-called feather edge without the danger of in any way destroying the cutting edge of the disk. This what I shall term floating grinder is an important feature as completely overcoming the objections heretofore referred to. Should it be found necessary to adjust the feather edge grinder, up or down, this can be readily accomplished by means of a set screw $i^2$ passing through the lower part of the supporting bracket $i$ and which is adjustable thereby on the bracket iron or rod, as shown in Fig. 2.

To rotate the emery wheel $H^7$ and to throw it in and out of action, I provide the following means: The lower part of the periphery of the driving pulley F' is grooved slightly as shown at $j$ and in this groove is placed the driving belt J which passes over the pulley $H^8$ on the end of the emery disk shaft. This belt is arranged conveniently loose and is carried and supported by a flange or circular plate K loosely supported for rotation on the head C in any convenient manner, as shown in Fig. 5. The diameter of the plate is greater than that of the pulley, thus forming a rest or ledge for the slackened belt. The plate K is rotatable and has a projecting arm $k$, at one side upon the upper surface of which is pivoted an idler pulley $k$; the same being positioned outside the belt, as shown in Fig. 3. $k^2$ designates a finger pin depending from the plate K and intended as a handle by which the operator can oscillate the plate backward and forward, carrying the idler pulley $k'$ into and out of contact with the belt J. $K^2$ designates a spring catch or pin mounted in a projection on the head and having its upper end resting against the bottom of the plate K. In the plate K is formed a series of apertures $k^3$ properly spaced so that, as the plate is oscillated to remove the idler pulley from the belt, the pin $K^2$ will project into one of the apertures, thereby limiting the outward movement of the idler pulley. When it is desired to tighten the belt, the operator presses the locking pin down, moves the plate K to force the idler pulley $k'$ into contact with the belt and when the pulley has sufficiently tightened the belt, the spring pin engages the other slot or opening $k^3$ in the plate and thus locks the belt in its tightened position causing the same to drive the grinding disk. In practice, I have found it desirable to have a supplemental idler pulley $K^8$ arranged on the outside of the belt opposite the other idler or tightening pulley. This pulley $K^3$ is secured to the tubular extension of the lug $H^6$, the same being carried by a pin or arm, as shown in Fig. 3. This latter pulley may be designated as a guiding pulley only. As soon as the operator adjusts the oscillating carrying plate so as to throw the belt tightener pulley out the belt will rest on the projecting edge of the oscillating plate.

It is to be observed that the means above described for tightening the belt to operate the grinding disk and the movement of the grinding disk into grinding position can all be effected promptly and easily without disturbing the other parts of the machine. Of course it is to be understood that other means can be employed for limiting the movement of the oscillating disk. The relative positions of the belt groove in the pulley F', and the supporting plate K is such that when the belt is slackened it is always in a position to enter the groove upon being tightened.

In this type of machine, it has been found desirable to have a power-driven work support so that the same will in effect constitute in addition to its function of supporting the stock, also a feed for the work. The usual practice has heretofore been to drive this work support by suitable gearing so associated with the driving mechanism for the cutter that the same are moved together or at the same interval of time and when the movement of one is checked it effects or checks the movement of the other member. This is objectionable for reasons stated. It is also desirable to avoid any intermittent feed or movement of the work support. In the present invention I have provided a work support and feed which may be controlled in its operative movements by the operator without in the least affecting the actuation of the circular knife. On the front side of the base I have formed a housing L having a longitudinal chamber L' in which is mounted a carrier $L^2$. This carrier, in the preferred form of construction, consists conveniently of a metal block having a longitudinal extension $L^3$ formed at opposite ends with suitable bearings located within the chamber L'. Passing through the bearing in the extension L and through a bearing in the block proper is a shaft M having keyed or otherwise secured to its outer end the work support S, while on the opposite end is secured a gear $m$. The teeth of this gear are chamfered or beveled from the vertical centers toward their outer edges, as shown more particularly in Fig. 8, and the gear is maintained or held in position by a nut $m'$ on the end of the shaft M. By removing the nut the shaft M including the work support can be withdrawn from the carrier. The sides of the carrier $L^2$ are fastened to fit closely the sides of the chamber L' at the left hand end thereof so that the carrier is prevented from moving laterally.

To mount the carrier for tilting movement, I conveniently form in the rear side of the head part thereof a curved channel $l$, the curvature thereof being struck from a point as its center designated at X, Figs. 8 and 12. This point is coincident with the front face of the gage, presently to be described, and the vertical central plane of the carrier. On the rear wall of the chamber adjacent the head of the carrier is formed a curved guiding flange $l^2$ fitting in the channel or groove *l* and forming a bearing for the carrier and permitting a pivotal or tilting movement around the center at the point X. To effect this tilting movement and maintain the carrier in its different tilted positions, I secure on the rear wall of the chamber L' a rack bar $L^4$ the same being curved to conform to the tilting movement of the carrier and in connection with this rack bar a pinion $L^5$ is placed with teeth engaging the rack bar, the pinion being located at the rear of the extended arm $L^3$ of the carrier as shown in Fig. 8 and is carried on a transverse shaft $l^5$ passing through the extension $L^3$ and through an elongated slot $L^6$ in a removable front plate of the chamber L'. The end of the shaft $l^5$ has splined thereon a hand wheel $l^7$, the shaft passing through the end thereof and being capped by a butterfly nut $l^8$ whose inner surface bears on the hand wheel $l^7$ so that by turning the nut the shaft is held from rotation, the same binding the face of the hand wheel tightly against the outer face of the casing. Obviously by loosening the nut and turning the hand wheel the shaft carrying the same may be turned and in turning rotates the pinion secured on its inner end and causes the same to travel up or down the rack bar, thus elevating or lowering the extension $L^3$ through which the shaft $l^5$ is passed. To actuate or drive the work support, I provide a construction, better shown in Fig. 7, the same consisting of a vertically disposed shaft N which is supported in a tubular part *n* on the base B, a bearing *n'* being provided at the upper end and a similar bearing $n^2$ at the lower end of the tubular part *n*. The shaft is held against unnecessary downward movement by the lower end of a worm sleeve O which is keyed or otherwise secured fixedly to its upper end, the worm thereof engaging with the teeth of the gear *m* on the work support shaft M. At the lower end of the shaft N is secured fixedly a shouldered disk O', the attachment being acquired in any convenient manner. The lower face of the disk is provided conveniently with a friction disk *o* the under face of which is adapted to engage the upper face of the driving pulley $O^2$, loosely mounted on the lower end of the shaft N. This driving pulley has a grooved periphery and a depending conical point *o'* normally resting on a lever P having a link connection with a suitable treadle (not shown,) Fig. 1. The pulley $O^2$ is belted to the main driving pulley by a suitable belt $o^2$ and as the operator places his foot on the treadle throwing up the inner end of the lever P, the pulley $O^2$ is elevated bringing its upper face into contact with the friction disk *o* on the disk $O'$ carried by the shaft N and thereby causes the shaft to rotate. In practice it has been found that when the operator forces the frictional surfaces into contact a very rapid speed would be transmitted through the worm at the end of the shaft to the work support. This is objectionable in that the feed in the first instance of operation should be gradual and increased with the proper position of the work. To avoid this sudden full speed movement being transmitted to the feed, I provide a drag or brake Q, the same being in the form of a pin located in a vertical recess in a collar or block Q' secured adjustably to the lower end of the tube *n*. This pin is spring pressed by having a spiral spring interposed between its rear end and the block. By this means the operator in forcing the friction surfaces into contact forces the pulley $O^2$ and the disk *o* slightly up, the drag or brake having a retarding effect sufficient to prevent the full actuation of the feed until the frictional contact is made sufficiently strong to overcome the friction of the drag or brake.

In constructing the feed wheel or work support, I have found it desirable to depart somewhat from the practice heretofore employed, so that the skive or cut may be made straight as distinguished from a curve or bend, as shown in Figs. 17 and 18. To accomplish this, the surface of the support is slightly concaved the curvature corresponding essentially or substantially with the curve of the knife or cutter. When the forwardmost point of the latter is directly above the center plane of the support, that is to say from the point where the cutter first acts on the stock, the support is gradually curved upward the difference in diameter being constant throughout the circumference of the support at the different points of increase, caused by the concaving of the surface. The curve of the support is, as I have above stated, of a shape such as would be generated by the intersection of the revolving work support with the circular knife when the work support is adjusted to its least angle with the knife. The shape of this work support can probably better be stated when it is considered that they are usually made of cast iron and that in forming the surface it might be well to suppose that the knife was supplanted by a milling cutter. If this were done the work support should be adjusted to its least angle with the revolving cutter, which latter would then be lowered into active position and mill off the surface of the support. I shall term this peculiarly shaped support in the definition of the invention as having a surface of concaved form, meaning thereby a curved surface having an increasing diameter toward its outer end, the increment being governed by the diameter of the revolving knife. The advantage of such a construction is that as the work is presented to the knife the outer edge is properly presented as to thickness while the receding part of the knife when acting on the material meets with that part of the material which has a support formed by the increased diameter of the outer part of the work support. This is diagrammatically illustrated in Figs. 19 and 20.

R designates the work gage which is secured fixedly to the upper outer edge of the carrier $L^2$. This gage has its edge projecting slightly above the surface of the work support and lies close to the edge thereof so that in the various adjustments the position of the work support and the gage are always constant. Manifestly this gage can be supported in any convenient manner but in practice I have found it desirable to fixedly secure it to the carrier, the rear end of the gage terminating at or near the vertical central plane of the carrier.

In this type of machine, it is necessary to have what is termed in this art a "presser finger," for maintaining the work in proper position on the feed and work support. In the preferred embodiment of my invention, I have shown a presser finger which consists of a curved arm T pivoted at the rear end of the head part of the carrier as at $t$ and working in a channel or groove $t'$ extending toward the work support. The outer end of this finger member is carried upward and has an offset $t^2$ on one side extending forward through which a suitable screw $t^3$ is threaded, the lower end of which normally rests on a projection $t^4$ conveniently extending from the gage plate R, as shown in Fig. 12. By turning the set screw $t^3$, the presser finger may be raised and lowered. To properly tension the pressed finger, the screw bolt $T^2$ is loosely passed through the said screw $t^3$ and carries on its lower end a spiral spring $t^5$, the upper end of which abuts the projection $t^4$ while its lower end abuts a head on the screw. The upper end of the screw has a suitable thumb nut $T^3$ thereon which by turning varies the pull of the spring on the presser finger bar. To properly position the presser finger relative to the different types or characters of work, I conveniently make the same of what I shall term a floating or tilting character, the same consisting of a curved presser finger proper, as at $T^4$, having a curvature corresponding with that of the edge of the disk knife and having two upwardly extending lugs $T^5$ and $T^6$ between which the projecting arm $T^7$ of the presser finger bar is placed and there secured by a pivot $t^6$. This pivotal arrangement is such that lateral pressure is resisted and the pressure of the spring $t^5$ is exerted directly on the presser finger through the pivot and the arm or projection $T^6$, while at the same time the finger will tilt to accommodate itself to the different characters or thicknesses of work at the same time exerting a constant pressure on the work throughout the entire length of the finger.

In machines of this character, it has been customary heretofore to supply or provide a guard disk to assist in feeding the work but in my present construction I have found that it is unnecessary to positively drive or rotate such disks. With this in view, I have provided an extension U on the carrier which has at its upper end a cylindrical bearing $u$. In this bearing is positioned a shaft $U'$, the same being keyed or held in adjusted position in a bearing $u$ by a clamping mechanism, as shown at $u'$, the latter consisting of a ball which is forced out by a set screw $u^2$ into close engagement with the surrounding walls or bearing $u$. At the outer end of the shaft or rod $U'$ is the bearing sleeve $U^2$ in which the shaft $u^3$ of the guard disk $U^3$ is mounted. The upper end of the shaft $u^3$ supports a ball $u^4$ which in turn is backed by a spring $u^5$, the tension of which is adjusted by a thumb nut $u^6$, as shown in Fig. 8. By means of the clamping mechanism the guard disk can be adjusted angularly about the axis of the shaft $U'$ and also longitudinally in the bearing $u$ thus allowing the selection of the most advantageous point of contact with the work support and adapting the disk for use with work supports of various widths, the guard disk being maintained in this position relative to the work support owing to its being carried by the work support carrier. The disk is rotated solely by the movement of the work support and the friction created between the same and the work as it passes to the knife.

In Fig. 15, I have shown a slightly modified form of grinding attachment, the same differing from the one heretofore described in that a simultaneous movement toward the cutter is effected. To accomplish this, I secure on the head of the machine a small pinion W which meshes with a rack on the slotted arm $W'$ of the spring actuated yoke carrying the emery wheel shaft. I also position in a bearing $W^2$ a sliding sleeve $W^3$ through which the arm $W^4$ carrying the feather edge grinder $w$ passes. This arm $W^4$ is held from rotation by having a pin $w'$ extending therefrom into an elongated slot in the sleeve $W^3$. The upper end of the sleeve is recessed and contains a small spring $w^3$ surrounding the upper end of the arm $W^4$ and serving as a support for the arm by a transverse pin $w^4$. By this means the operator by turning the pinion W, through a suitable lever, forces down the emery wheel and raises the feather edge grinder, the spring $w^3$ serving to compensate for any variations between the surfaces and to yieldingly press the grinder w into abrasive contact with the under face of the disk.

In Fig. 13 I have shown a special method of securing the cutting disk in place. These disks, as has heretofore been the practice, were made of steel shaped to form a concaved under face. The disks were rendered very expensive in view of the peculiar shaping required. I have found that this expense and objection can be overcome by forming the disks perfectly flat of a single piece of sheet metal and finishing the edges thereof and inasmuch as such flat plates are usually more or less irregular, I spring the disk into the concaved carrier d'. This results in properly straightening out the outer circular edge of the cutter and renders the disk type useful so that the knives when worn out can be replaced at a very small cost. This flat disk construction is shown in Fig. 13ª directly below Fig. 13.

In view of the detailed description of the parts and the operation as stated in connection with the description, it is thought that the general operation of the machine will be fully understood. It may be stated, however, briefly to be as follows: As the operator presents the material to the cutter the character of the skive is first ascertained, the work support adjusted to vary the inclination of the skive, the knife is then adjusted vertically to secure the desired thickness of edge. The operator then places his foot on the treadle throwing the feed into operation and the material presented to the rapidly revolving knife. The moment the operator wishes to stop the feed he removes his foot from the treadle and the work support ceases to rotate. It will be noticed that the various adjustments can all be made from the front of the machine.

As stated in these specifications heretofore, I do not wish to be limited to the constructions shown. Variations can be made and parts can be differently positioned without departing from the invention.

Having thus described the invention, what I claim as new and desire to secure by Letters Patent is:—

1. In a skiving machine, the combination with a rotating disk cutter, and means for driving the same, of a work support having a driving connection with said cutter driving means, and means under the control of the operator for governing the movement of the work support while maintaining uniform movement of the cutter.

2. In a skiving machine, the combination with a rotary cutter, means for driving the same at a high rate of speed, of a tilting work support, means connected with said driving means for driving the work support, and means under the control of the operator for governing the movement of the work support independent of the movement of the cutter.

3. In a circular knife skiving machine, the combination with a circular knife, means for driving the same at a high rate of speed, a work support, means connected with said driving means for driving the work support, means under the control of the operator for governing the movement of the work support relative to the movement of the knife, and means for adjusting the knife.

4. In a circular knife skiving machine, the combination with a circular knife and means for driving the same at a high rate of speed, of a tilting work support, means connected with said driving means for driving the work support, means under the control of the operator for governing the movement of the work support independent of the movement of the knife, and means for adjusting the knife to and from the work support.

5. In a circular knife skiving machine, the combination with a circular knife, of means for driving the same at a high rate of speed, of a rotatable work support, means for driving the same connected with said knife driving means, and means for interrupting the movement of the work support independent of and while the knife is continued in its rotation.

6. In a skiving machine, the combination with a cutter, of a tilting work support, mechanism for rotating the support while in its various positions, means for varying the rotary movement of the work support and connecting mechanism between said rotating mechanism and the cutter acting continuously during the variable movements of the work support.

7. In a skiving machine, the combination with a base, of a tilting feed, means for driving the feed, a head, a cutter carried by the head, means for driving the cutter, and means for adjusting the cutter and driving means vertically in relation to the feed.

8. In a skiving machine, the combination with a cutter shaft and its cutter, of a pulley on the shaft, a driving pulley on the machine, means for simultaneously adjusting the cutter and the driving pulley vertically, and means for actuating the driving pulley.

9. In a skiving machine, the combination with a base of a vertically movable head on the base fixedly secured against tilting movement, means for effecting the movement of the head, a knife shaft fixedly secured against tilting movement in the head, means for driving the shaft, and means for adjusting the head laterally.

10. In a skiving machine, the combination with a cutter shaft and its cutter, of a pulley on the shaft, a driving pulley, means for adjusting the cutter and the driving pulley vertically, means for actuating the driving pulley, and means for locking the parts in their adjusted positions.

11. In a skiving machine, the combination with a base, of a vertically movable head on the base, means for effecting the movement of the head, a knife shaft fixedly supported against tilting movement in the head, means for driving the shaft, means for adjusting the head laterally, and means for locking the parts in their adjusted positions.

12. In a skiving machine, the combination with a rotary cutter, means for adjusting the cutter toward and from the work support, a tilting work support, means for driving the support, means for driving the cutter connected with said support driving means and friction means under the control of the operator for regulating the movement of the support while permitting the continued movement of the cutter.

13. In a skiving machine, the combination with the cutter and the rotatable work support, of means for varying the relative angular position between the cutter and the support from a center approximating the position occupied by the edge of the stock as it passes through the machine.

14. In a skiving machine, the combination with a rotatable work support and cutter, of means for changing the relative angular position of the support and cutter comprising a support for one of the members having its center of pivotal movement located adjacent the path of the edge of the stock as it is passed through the machine.

15. In a skiving machine, the combination with a rotatable work support and cutter, of means for changing the relative angular position between the support and cutter comprising a carrier for one of the members pivotally supported from a point adjacent the path of the edge of the stock as it passes through the machine, and means for maintaining the parts in their adjusted position.

16. In a skiving machine, the combination with a rotary cutter, of a tilting rotatable work support having its axis of tilting movement at a point at the edge of the path of the stock passing through the machine, and means for adjusting the support.

17. In a skiving machine, the combination with a cutter of a tilting work support pivotally supported from a point at the path of the edge of the stock being treated, means for adjusting the support, and means for adjusting the cutter vertically and laterally.

18. In a skiving machine, the combination with a cutter, of a tilting work support having its axis of movement positioned at a point adjacent the path of the edge of the stock being treated, means for driving the cutter, means for driving the support, and means for adjusting the cutter vertically and transversely relative to the support.

19. In a skiving machine, the combination with a cutter, of a rotary work support, a gage fixedly secured relative to the support, and means whereby the relative angular position of the support and cutter may be varied from a point adjacent to the face of the gage and in substantially the vertical axial plane of the support.

20. In a skiving machine, the combination with a rotary cutter, of a rotary work support, a gage, and means for angularly adjusting the work support relative to the cutter, said angular adjustment being effected from a point approximating the surface of the gage and the vertical axial plane of the support.

21. In a skiving machine, the combination with a cutter or knife, of a tiltable gage and rotary work support, and means for supporting the work support and gage for tilting movement so that the center of movement will be about an axis intersecting approximately the stock engaging surface of the gage.

22. In a skiving machine the combination with a cutter, of a rotary work support, a gage positioned to move with the support and means for tilting the support about a center approximating the upper part of the surface of the work support and the gage.

23. In a skiving machine, the combination with a cutter, and a tilting work support, of a carrier for the support, a gage fixedly secured relative to the work support, a presser finger mounted to move with the carrier and means for tilting the work support, gage and presser finger from the center approximating the upper surface of the work support and the face of the gage.

24. In a skiving machine, the combination with a cutter, of a tiltable carrier, a revolving work support having a shaft journaled in the carrier, means for tilting the carrier, and a guard disk mounted on and carried by the carrier.

25. In a skiving machine, the combination with a cutter, of a tilting carrier, a work support mounted for rotation on the carrier, means for driving the work support, and an adjustable guard disk carried on the carrier.

26. In a skiving machine, the combination with a tilting work support and means for rotating the same, of a spring pressed guard disk freely movable and having its edge positioned to overlap a portion of the work support whereby the movement of the stock through the machine causes the guard to be rotated.

27. In a skiving machine, the combination with a cutter of a tilting carrier, an arm on the carrier, a guard disk stem adjustably mounted in the arm, a spring for forcing the guard disk normally into contact with the stock and a work support on the carrier.

28. In a skiving machine, the combination with a cutter, of a tiltable carrier, a rotatable work support having an actuating shaft mounted on said carrier, a rack, means engaging the rack for adjusting the carrier into different positions, a drive shaft, a worm on the drive shaft, and a worm wheel on the work support shaft.

29. In a skiving machine, the combination with a cutter and mechanism for driving the same, of a tiltable carrier, a rotatable work support on the carrier, connected mechanism between the cutter driving mechanism and the work support for actuating the latter, means for adjusting the work support during the operation of the cutter and means under the control of the operator for causing a relative variable speed between the work support and the cutter.

30. In a skiving machine, the combination with a rotary cutter and mechanism for driving the same, of a tiltable work support, connected mechanism on the machine for driving the work support and the cutter, and means for changing the relative speeds of the cutter and work support during the movement of the cutter.

31. In a skiving machine, the combination with a cutter and a work support, of connected mechanism for simultaneously actuating the same and mechanism whereby the relative movements of the cutter and work support can be varied during the movement of the cutter.

32. In a skiving machine, the combination with a cutter and a work support, of a gage fixedly secured relative to the work support and a presser finger comprising an arm having a pivotal connection at its end, a presser finger at its opposite end, and a yieldingly supported adjusting device interposed between the ends, substantially as described.

33. In a skiving machine, the combination with a cutter, of a tilting carrier, means for tilting the carrier, a work support on the carrier, and a rotatable guard carried by the carrier and movable therewith.

34. In a skiving machine, the combination with a disk cutter, of a tilting carrier, a work support on the carrier, a shaft mounted on the carrier and secured to the work support, a gear on the shaft, a worm for actuating said gear and means for pivotally supporting the carrier so that its axis of movement will be at a point adjacent the edge of the path of the stock passing through the machine.

35. In a skiving machine, the combination with a cutter, of a tilting work support, a shaft carrying the work support, a gear on the shaft, mechanism for driving the gear comprising a friction member, means under the control of the operator for throwing the friction member into active position and connected mechanism between said driving mechanism and the cutter for maintaining the speed of the cutter.

36. In a skiving machine, the combination with a cutter and means for driving the same, of a work support, a shaft carrying the work support, a gear on the shaft, mechanism for driving the gear comprising a friction member, means under the control of the operator for throwing the friction member into active position, and a brake for checking the primary or starting movement of the friction member.

37. In a skiving machine, the combination with a rotary disk knife and means for driving the same, of a work support having a supporting surface of gradually increasing diameters the increment being proportioned to substantially a curve generated by the knife.

38. In a skiving machine, the combination with a rotary disk knife, and means for actuating the same, of a work support adjacent the knife having a concaved supporting surface.

39. In a skiving machine, the combination with a rotary disk knife, of a work support associated therewith and having a curved supporting surface the larger diameter of which is presented toward the outer edge of the support.

40. In a skiving machine, the combination with a rotary disk knife and means for driving the same, of a work support located adjacent the knife and projecting beyond the edge thereof and having a concaved supporting surface of gradually increasing diameter toward the outer edge.

41. In a skiving machine, the combination with a rotary disk knife, of a work support having a supporting surface formed of gradually increasing diameter, the curvature of the surface caused by the increment thereof being generated to approximate the curvature of the knife whereby the material being skived will find support beneath the curved cutting edge of the knife, substantially throughout the width of the support.

42. In a skiving machine, the combination with a rotary disk knife, of a concaved work support positioned to project beyond the edge of and adjacent to the knife, and a presser finger adjacent the support.

43. In a skiving machine, the combination with a base, of a head, a knife carried by the head, and a work support carried by the base, of inclined planes for adjusting the head relative to the base and independent means for maintaining the head on the base.

44. In a skiving machine, the combination with a base, of a head fixed against tilting movement, a work support carried by the base, a cutter carried by the head, means for adjusting the head vertically relative to the base, yielding means for maintaining the relative positions of the head and base and an indicating scale at the point of adjustment.

45. In a skiving machine, the combination with a skiving knife, a shaft carrying the same, a driving mechanism comprising a driving member having a fixed bearing, a self-centering connection between the driving mechanism and the shaft and a work support associated with the knife.

46. In a skiving machine, the combination with a skiving knife and its shaft, of a bearing therefor, a driving member surrounding the bearing, and a connection between said driving member and the shaft above the plane of said bearing.

47. In a skiving machine, the combination with a skiving knife and its shaft, a bearing therefor, means located laterally beyond the shaft for driving the same, means for preventing lateral strains on the cutter shaft comprising a member to which power is applied, said member having a bearing on the bearing of the shaft and being connected with the shaft at a point beyond its bearing.

48. In a skiving machine, the combination with a skiving knife and its carrying shaft, a bearing therefor, a pulley surrounding said bearing, anti friction bearings interposed between said bearing and pulley, a connection between said pulley, and the shaft, and means for transmitting motion to the pulley.

49. In a skiving machine, the combination with a skiving knife and its carrying shaft, a bearing therefor, a pulley surrounding said bearing, anti friction bearings interposed between said bearing and pulley, a loose connection between said pulley and the shaft, and means for transmitting motion to the pulley.

50. In a skiving machine, the combination with a skiving knife a supporting shaft therefor, of a bearing for the shaft, a driving member surrounding the bearing, and a loose connection between said driving member and the shaft.

51. In a skiving machine, the combination with a skiving knife and its carrying shaft member, of a bearing therefor, the driving member for the shaft having its bearing on the said other bearing, a yoke loosely mounted on the end of the shaft, and projections from the driving member loosely engaging said yoke.

52. In a skiving machine, the combination with a rotary circular disk knife, of a shaft supporting the same, a bearing for said shaft, a pulley surrounding the shaft having a bearing on the said shaft's bearing, a pulley located laterally beyond the said other pulley, and a belt connection between the pulleys.

53. In a skiving machine a rotary disk knife, a shaft supporting the knife, a driven member for the shaft having a bearing independent of the shaft, and a movable connection between the driven member and the shaft.

54. In a skiving machine, the combination with a rotary knife, of a grinding wheel, means for moving the same toward and from the knife and a self-seating feather edge grinder located below the knife and connected with said adjusting means.

55. In a skiving machine, the combination with a grinding disk, means for moving the same toward and from the knife, of a loosely mounted self centering grinding member located below the knife and actuated by said means.

56. In a skiving machine, the combination with a frame part, and a cutting disk of a spring pressed yoke, a lever for actuating the yoke, a grinding disk carried by the yoke, means for driving the disk, a feather edge grinding member mounted independently of the disk and means for forcing the said feather edge grinding member into contact with the under face of the cutting disk.

57. In a skiving machine, the combination with a grinding disk and its actuating mechanism, means for adjusting the disk into contact with the knife, and a feather edge grinding disk, means for carrying the same independent of the grinding disk shaft, and connected mechanism for adjusting the disk and the feather edge member simultaneously into engagement with the knife.

58. In a skiving machine, the combination with a rotary knife, of a pulley for actuating the same, a movable supporting plate below the pulley, a grinding disk, a pulley for driving the same, a belt connecting the pulleys, and means for tightening the belt and moving it from the supporting plate onto the said driving pulley.

59. In a skiving machine, the combination with a main driving pulley, of a belt supporting member projecting beyond the same, a grinding mechanism, a belt for driving the latter normally resting on said support and means for tightening the belt and drawing it onto the said pulley from the support.

60. In a skiving machine, the combination with a main driving pulley, of a belt support below the same, means for rotating the belt support, a tightening means carried by said support, a grinding mechanism, a belt connecting the latter with the pulley and arranged to rest on said support and be engaged by the tightening device.

61. In a skiving machine, the combination with a knife grinding instrumentality, of a belt for driving the same, a belt tightener comprising an oscillating belt supporting plate arranged below the belt and a pulley for engaging the belt during the oscillation in one direction, and means for locking the plate against oscillation.

62. In a circular knife skiving machine, the combination with a rotary work support and a skiving knife, of a guard disk adjacent the work support, a shaft carrying the disk and means for permitting an adjustment of the disk longitudinally of the work support, substantially as described.

63. In a skiving machine, the combination with a work support, of a rotary skiving knife, mechanism for driving the knife comprising independent driving members, and means for moving the driving mechanism and the knife jointly for effecting a relative adjustment between the cutter and the work support.

64. In a skiving machine, the combination with a work support, of a rotary skiving knife, a driven member for actuating the knife, a driving mechanism between said driven member and the knife, and means for adjusting the knife and the driven member jointly for varying the position of the knife relative to the support while maintaining the driving connection.

65. In a skiving machine, the combination with a cutter shaft and its cutter, of a driven device for actuating the shaft, an independent driven device for actuating the other driven device, and adjustable means for supporting the said driven devices whereby upon the movement of said support the said driven devices are jointly movable.

66. In a leather skiving machine, the combination with a rotary disk cutter and means for actuating the same, of a tilting work support, a carrier for the work support, a presser finger and arm carrying the finger having a pivotal connection with the carrier, and an adjustable spring connection between the carrier and the said arm.

67. In a skiving machine, the combination with a base, of a vertically movable head mounted for rotation on the base, a driving pulley carried by the head, a skiving knife, a shaft therefor, a driving connection between the pulley and the shaft, and means for adjusting the head transversely comprising a member carried by the base and a member engaging the head, one of said members having a loose connection with its associate part.

68. In a skiving machine, the combination with a base, of a vertically movable head pivotally supported thereon, a skiving knife carried by the head, a shaft for the knife, a driving mechanism comprising a pulley supported on the head, and means for moving the head laterally relative to the base comprising a screw member secured to the base, and a loosely supported pin member which the screw engages carried by the head.

69. In a skiving machine, the combination with a base, of a head mounted for vertical movement and rotary movement thereon, a skiving knife carried by the head, and means for moving the head transversely and maintaining it in its adjusted position comprising a screw member supported by the base and a loosely positioned member carried by the head.

70. In a skiving machine, the combination with a base, of a head mounted for vertical and pivotal movement thereon, means for moving the head vertically, means for adjusting the head laterally and maintaining the same in its adjusted position, a skiving knife, and means carried by the head for driving the knife.

71. In a skiving machine, the combination with a skiving knife and means for driving the same at a high rate of speed, of a work feed, means for actuating the feed, and mechanism under the control of the operator for varying the movement of the feed independent of the movement of the knife.

72. In a skiving machine, the combination with a rotary skiving knife and a feed, of means for driving the knife at a high rate of speed, means actuated with said driving means for actuating the feed, and mechanism under the control of the operator for varying the movement of the feed while maintaining the speed of the knife.

73. In a machine of the class described, the combination of a revoluble member adapted to sharpen a knife; a non-revoluble bur remover; and means for moving said revoluble member and bur remover toward and from each other to engage said knife.

74. In a machine of the class described, the combination of a revoluble member adapted to sharpen a knife; a non-revoluble bur remover; and means for moving said revoluble member and bur remover toward and from each other to simultaneously engage said knife.

75. In a machine of the class described, the combination of a revoluble member adapted to sharpen a knife, a movable bur removing member, means for supporting the same, and means for moving the revoluble member and the bur removing member toward and from each other to simultaneously engage the knife.

76. In a machine of the class described, the combination of a revoluble member adapted to sharpen a knife, a bur removing member, means for loosely supporting the bur removing member whereby the same may be adjusted, and means for simultaneously moving the bur removing member and the revoluble member toward the knife.

77. In a machine of the class described, the combination with a revoluble member adapted to sharpen the knife of a non-revoluble bur remover, means for moving the revoluble member toward the knife, and means for supporting the bur remover in a manner to be moved toward the knife.

In testimony whereof I affix my signature in presence of two witnesses.

LOUIS W. G. FLYNT.

Witnesses:
F. C. PATRICK,
QUENTIN W. BOOTH.